2,908,603
MODIFIED MELAMINE LAMINATING RESINS

Milton J. Scott, Lexington, Mass., assignor to Monsanto Chemical Company, St. Louis, Mo., a corporation of Delaware No Drawing. Application February 1, 1957
Serial No. 637,632

9 Claims. (Cl. 154—140)

This invention relates to melamine-formaldehyde resins. More particularly, the invention relates to modified melamine-formaldehyde condensates having improved flow.

Condensates of melamine with formaldehyde are used extensively as molding powders and as laminating resins. They are particularly desirable for their high gloss, lack of inherent color, and chemical resistance. One obstacle to an even greater popularity of these materials is their relatively poor flow characteristics under economical processing conditions.

One object of this invention is to modify melamine-formaldehyde condensates.

A further object is to provide melamine-formaldehyde condensates having increased flow without detracting from the inherent qualities of the condensates.

Another object is to provide laminates at least the topmost layer of which is impregnated with and bonded to the remainder of the laminate with a modified melamine-formaldehyde resin having increased flow.

These and other objects are attained by modifying melamine-formaldehyde condensates with cyclic ethylene urea or the methylol derivatives thereof.

The following examples are given in illustration and are not intended as limitations on the scope of this invention. Where parts are mentioned, they are parts by weight.

EXAMPLE I

Mix together 126 parts (1 mol) of melamine, 253 parts (about 3 mols) of formalin (37% formaldehyde) and 30 parts of water. Adjust the pH of the mixture to 8.5–9.5 with aqueous alkali and then heat the mixture to about 85° C. Add 52 parts of cyclic ethylene urea (about 0.6 mol) and continue heating the reaction mixture at 85–95° C. until a 25% water dilutability point is attained. Cool the reaction mixture and filter it. The product is a high solids solution in water of a co-condensation product of melamine, cyclic ethylene urea and formaldehyde. It is clear and substantially colorless. The resin may be recovered in a soluble fusible form from the solution by conventional drying methods such as, for example, spray drying or oven drying. For use as a laminating syrup, the solution may be used without modification or after dilution with water to a lower solids content.

The relative flow properties of laminating syrups are tested by a simple procedure which simulates practical operating conditions. The procedure is as follows:

Impregnate paper by dipping it into the laminating syrup, withdrawing the paper slowly from the syrup, and wiping away excess impregnant with a scraper bar. The resin pickup on a solids basis should be from 60–65% by weight of the paper. Any type of paper normally used in the laminating industry may be used including rayon rag stock, alpha cellulose stock, etc. The impregnated paper is then dried at elevated temperatures without substantially advancing the cure of the resin.

The impregnated paper is then cut into a plurality of 1⅝" circular pieces. Twelve of the pieces are superimposed to form a stack. The stack is weighed and then laminated under a pressure of 1000 p.s.i. at 150° C. for 3 minutes. Cool the laminate and cut off the flash, i.e., the resin that has flowed out beyond the periphery of the laminate. Obtain the weight of the flash by weighing the trimmed laminate and subtracting its weight from that of the original stack. The percent flow is calculated by dividing the weight of the flash by the weight of the unpressed stack.

Since it is difficult to duplicate conditions exactly from day to day, a blank or control sample should always be run simultaneously with the resin to be tested.

Using the above described test, three laminating syrups were evaluated: (a) a blank made as in Example I except that no cyclic ethylene urea was used; (b) the syrup of Example I; and (c) a syrup similar to that of Example I except that 65 parts of cyclic ethylene urea (about 0.75 mol) was used. Each of the syrups was diluted to 50% solids by weight and the impregnated paper was dried at 120° C. The results obtained are shown in Table I.

TABLE I

| Resin | Percent Volatiles | Percent Flow |
|---|---|---|
| A | 5 | 7 |
| B | 5 | 20 |
| C | 5 | 22 |

The percent volatiles is the percent of volatile solvent, generally water, left in the impregnated paper at the time the lamination is effected. The amount of volatiles has a direct effect on the quality of the product, i.e., the higher the volatiles, the more frequent are the defects in the finished product. Therefore, it is desirable to lower the percent volatiles as much as possible while still retaining at least about 9% flow.

From Table I, it can be seen that at 5% volatiles, the control had a flow of only 7% whereas resins B and C still had a flow of 20–22%. This would make it possible to substantially reduce the volatile content of paper treated with resins B or C which would result in greatly improved laminate properties such as gloss, dimensional stability, abrasion resistance, etc.

EXAMPLE II

Part A

A 4 mil sheet of alpha cellulose paper is impregnated with the resin solution prepared in Example I and the excess impregnant is wiped from the paper with sponge rolls. The sheet is dried for 15 minutes at 110° C. and has a solids pickup of 50%.

Part B

Ten sheets of resin-impregnated paper are placed in a stack. The bottom 8 sheets are kraft paper impregnated with a phenol-formaldehyde resin. The 9th sheet has a printed design on the top surface and is impregnated with a commercially available unmodified melamine-formaldehyde resin containing approximately 2.5 mols of combined formaldehyde per mol of melamine. The top sheet is the resin-impregnated alpha cellulose paper prepared in Part A above. The stack is pressed for 15 minutes at 150° C. and a pressure of 1,000 p.s.i. The resultant laminate has excellent gloss and a hard mar-resistant surface.

EXAMPLE III

Part A

A total of 128 parts (1.02 mols) of melamine, 243 parts of 37% formalin (3.0 mols of formaldehyde) and 0.15 part of 25% NaOH solution are charged to a reaction vessel and heated to 85° C. To the reaction vessel are then charged 110 parts of a 57% aqueous solution of dimethylol cyclic ethylene urea (0.43 mol of dimethylol cyclic ethylene urea). The reactants are maintained at a temperature of 68–95° C. until a 25% water-dilutability point is reached. The molar ratio of reactants is 1 mol of melamine, 0.43 mol of cyclic ethylene urea and 3.86 mols of formaldehyde.

Part B

Sheets of alpha cellulose paper are impregnated with the resin solution prepared in Part A above and dried for, respectively, 7, 10 and 15 minutes at 110° C. The flow of the resin is measured by the test procedure previously described. The volatiles content and the flow are set forth in Table II.

TABLE II

| Drying Time, Min. at 110° C. | Percent Volatiles | Percent Flow |
| --- | --- | --- |
| 7 | 5.85 | 39.6 |
| 10 | 4.76 | 27.6 |
| 15 | 4.36 | 16 |

EXAMPLE IV

Part A

Example III, Part A, is repeated except that 182 grams of the 57% dimethylol cyclic ethylene urea solution are employed in lieu of the quantity stated in Example III, Part A. The molar ratio of reactants is 1 mol of melamine, 0.7 mol of cyclic ethylene urea and 4.3 mols of formaldehyde.

Part B

Sheets of alpha cellulose paper are impregnated with the resin solution prepared in Part A above and dried for, respectively, 7 and 15 minutes at 110° C. The flow of the resin as measured by the previously described test procedure is set forth in Table III.

TABLE III

| Drying Time, Min. at 110° C. | Percent Volatiles | Percent Flow |
| --- | --- | --- |
| 7 | 5.83 | 26.6 |
| 15 | 3.94 | 7.58 |

The co-condensation products of this invention contain 1 mol of melamine, 2–5 mols of formaldehyde and 0.1–0.75 mol or preferably 0.5–0.75 mol of cyclic ethylene urea. If the co-condensation products contain less than about 0.1 mol of cyclic ethylene urea no substantial effect upon the flow of the resin is noticeable. As the molar proportion of cyclic ethylene urea is increased above about 0.1 mol, a noticeable improvement in the flow of the resin is observed with the maximum flow being obtained when the molar proportion of cyclic ethylene urea is from about 0.5 mol to about 0.75 mol. When the proportion of cyclic ethylene urea is increased to above about 0.75 mol, certain of the desirable properties of the co-condensation products are impaired.

The co-condensation products of the invention can be prepared by numerous techniques. Preferably, formaldehyde is first condensed with melamine to form methylol melamines and the cyclic ethylene urea is then added thereto and the reaction mixture is heated to intercondense the cyclic ethylene urea and the methylol melamines and to advance the resin. In another embodiment of the invention melamine and cyclic ethylene urea are separately condensed with formaldehyde to form methylol melamines and methylol cyclic ethylene ureas which are subsequently heated together to intercondense the methylol compounds and to advance the resin. In general, the resinification reaction is carried out under alkaline conditions, e.g. at a pH of 8–10, and at temperatures in the range of 80–100° C. The reaction is preferably carried out in concentrated aqueous solutions so as to prepare a resin solution having a total solids content from about 50% to about 70%. The reaction is usually continued until the 25% dilutability point of the co-condensation product is reached. By "25% dilutability point" is meant that the reaction product may be diluted with water to 25% solids at 25° C. without precipitating the resin.

The amount of resin used in paper laminates will vary according to the properties desired, from 35 to 70% by weight of the paper being the usual range, depending on the type of paper being used.

The resins of this invention can be cured to an insoluble infusible state by heating at temperatures between 130 and 160° C., preferably under substantial pressure. The physical and chemical properties of the cured resin are equivalent to cured unmodified melamine-formaldehyde resins.

Due to the light color of these resins, they are particularly valuable for use in preparing decorative laminates in which a decorative surface sheet is laminated to a solid or laminated core. Most frequently, the core consists of a laminate made from a plurality of paper plies bonded with a thermosetting resin such as, for example, a phenolic or alkyd resin. In some cases, the core is a solid block of wood and in others it is the so-called hardboard which comprises wood waste bonded with a thermosetting resin under high pressure. The decorative sheet may be of paper, or various textile materials such as cotton, glass, nylon, vinyl resin, etc. fabrics.

This application is a continuation-in-part of my co-pending application Serial No. 440,288, filed June 29, 1954 and now abandoned.

What is claimed is:

1. A water-soluble, thermosettable co-condensation product of reactants consisting essentially of 1 mol of melamine, 2–5 mols of formaldehyde and 0.1–0.75 mol of cyclic ethylene urea.

2. A water-soluble, thermosettable co-condensation product of reactants consisting essentially of 1 mol of melamine, 2–5 mols of formaldehyde and 0.5–0.75 mol of cyclic ethylene urea.

3. A water-soluble, thermosettable co-condensation product of reactants consisting essentially of 1 mol of melamine, 3 mols of formaldehyde and 0.6 mol of cyclic ethylene urea.

4. A process for preparing a high flow melamine resin which consists essentially of reacting 1 mol of melamine, with 2–5 mols of formaldehyde and 0.1–0.75 mol of cyclic ethylene urea at 80–100° C. and at a pH of 8–10 until a 25% water dilutability point is reached.

5. A laminate comprising a plurality of laminae impregnated and bonded with a co-condensation product of reactants consisting essentially of 1 mol of melamine, 2–5 mols of formaldehyde and 0.1–0.75 mol of cyclic ethylene urea, said co-condensation product having been cured in situ in the laminate to an insoluble infusible state under heat and pressure.

6. A laminate comprising a plurality of laminae at least the top-most layer of which is impregnated with and bonded to the remainder of the laminate with a co-condensation product of reactants consisting essentially of 1 mol of melamine, 2–5 mols of formaldehyde and 0.1–0.75 mol of cyclic ethylene urea, said co-condensation product having been cured in situ in the laminate to an insoluble infusible state under heat and pressure.

7. In the method for preparing a laminate in which a plurality of resin-impregnated layers of fibrous material are assembled in superimposed relationship, placed under pressure and heated until the resin has cured; the improvement which comprises impregnating at least the top-most layer of said fibrous material with a co-condensation product of reactants consisting essentially of 1 mol of melamine, 2–5 mols of formaldehyde and 0.1–0.75 mol of cyclic ethylene urea.

8. In the method for preparing a laminate in which a plurality of resin-impregnated layers of fibrous material are assembled in superimposed relationship, placed under pressure and heated until the resin has cured; the improvement which comprises impregnating at least the top-most layer of said fibrous material with a co-condensation product of reactants consisting essentially of 1 mol of melamine, 2–5 mols of formaldehyde and 0.5–0.75 mol of cyclic ethylene urea.

9. In the method for preparing a laminate in which a plurality of resin-impregnated layers of fibrous material are assembled in superimposed relationship, placed under pressure and heated until the resin has cured; the improvement which comprises impregnating at least the top-most layer of said fibrous material with a co-condensation product of reactants consisting essentially of 1 mol of melamine, 3 mols of formaldehyde and 0.6 mol of cyclic ethylene urea.

References Cited in the file of this patent

UNITED STATES PATENTS

| | | |
|---|---|---|
| 2,084,081 | Faber | June 15, 1937 |
| 2,690,404 | Spangler et al. | Sept. 28, 1954 |

FOREIGN PATENTS

| | | |
|---|---|---|
| 480,316 | Great Britain | Mar. 24, 1938 |

OTHER REFERENCES

Monsanto Chemicals and Plastics Resloom, "Schreinering," 1952, pp. 5 and 27.